United States Patent
Uchida

(10) Patent No.: US 10,340,834 B2
(45) Date of Patent: Jul. 2, 2019

(54) DRIVE SYSTEM

(71) Applicant: TOYOTA JIDOSHA KABUSHIKI KAISHA, Toyota-shi, Aichi-ken (JP)

(72) Inventor: Kenji Uchida, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/889,504

(22) Filed: Feb. 6, 2018

(65) Prior Publication Data

US 2018/0262149 A1 Sep. 13, 2018

(30) Foreign Application Priority Data

Mar. 13, 2017 (JP) ................................ 2017-047268

(51) Int. Cl.
*H02P 27/06* (2006.01)
*H02P 29/024* (2016.01)
*H02P 29/032* (2016.01)
*B60L 3/04* (2006.01)

(52) U.S. Cl.
CPC .............. *H02P 29/027* (2013.01); *B60L 3/04* (2013.01); *H02P 27/06* (2013.01); *H02P 29/024* (2013.01); *H02P 29/032* (2016.02); B60L 2240/529 (2013.01); Y02T 10/642 (2013.01); Y02T 10/7241 (2013.01)

(58) Field of Classification Search
CPC .. H02P 27/04; H02P 27/06; H02P 1/00; H02P 3/00; H02P 6/00; H02P 6/14; H02P 3/20; H02P 3/22; H02P 21/00; H02P 23/00; H02P 27/00; H02P 21/0035; H02P 29/02; H02P 25/00; H02P 29/024; H02P 29/0241; H02P 29/032; H02M 1/32; B60L 3/003; B60L 3/0069; B60L 3/04; B60L 11/1803
USPC ......... 318/400.01, 400.02, 400.14, 700, 701, 318/727, 800, 801, 430, 375, 376; 363/40, 95, 120, 175; 361/23
See application file for complete search history.

(56) References Cited

U.S. PATENT DOCUMENTS

| 7,688,018 | B2 * | 3/2010 | Goto | ........................ H02P 6/14 318/432 |
| 7,813,152 | B2 * | 10/2010 | Noda | .................. H02M 7/5387 363/132 |
| 7,855,527 | B2 * | 12/2010 | Goto | ....................... B60L 1/003 318/139 |

(Continued)

FOREIGN PATENT DOCUMENTS

| JP | 2010-047083 A | 3/2010 |
| JP | 2011-172343 A | 9/2011 |

(Continued)

*Primary Examiner* — Antony M Paul
(74) *Attorney, Agent, or Firm* — Sughrue Mion, PLLC

(57) ABSTRACT

A drive system shifts an inverter from a gate blocking state to a three phase-on state. When it is determined that electric current flows in a diode of an upper arm of the inverter by referring to a phase current of each phase of a motor, the drive system turns on a switching element of the upper arm and thereby shifts the inverter to an upper arm three phase-on state. When it is determined that electric current flows in a diode of a lower arm of the inverter by referring to the phase current of each phase, the drive system turns on a switching element of the lower arm and thereby shifts the inverter to a lower arm three phase-on state.

5 Claims, 5 Drawing Sheets

(56) References Cited

U.S. PATENT DOCUMENTS

| | | | |
|---|---|---|---|
| 8,970,155 B2 * | 3/2015 | Funaba | H02P 27/08 318/519 |
| 9,493,092 B2 * | 11/2016 | Kondoh | H02J 7/34 |
| 2013/0049665 A1 | 2/2013 | Oyobe et al. | |
| 2016/0352262 A1 | 12/2016 | Kataoka | |

FOREIGN PATENT DOCUMENTS

| | | | |
|---|---|---|---|
| JP | 2013-046432 A | 3/2013 | |
| JP | 2016-220459 A | 12/2016 | |

* cited by examiner

DRIVE SYSTEM

CROSS-REFERENCE TO RELATED APPLICATION

This application claims priority to Japanese Patent Application No. 2017-047268 filed on Mar. 13, 2017, the contents of which is incorporated herein by reference.

TECHNICAL FIELD

The present disclosure relates to a drive system and more specifically to a drive system equipped with a motor, an inverter and a power storage device.

BACKGROUND

A drive system includes a motor; an inverter that includes a plurality of switching elements (transistors) and a plurality of diodes connected in parallel to the plurality of switching elements and that is configured to drive the motor by switching of the plurality of switching elements; and a battery that is connected with the inverter via a power line. A proposed configuration of the drive system shifts the inverter to a three phase-on (three phase short circuit) state, when the inverter is in a gate blocking state, a reverse voltage generated with rotation of the motor is higher than a direct current voltage of the inverter, and an electric power input into the battery is higher than a predetermined electric power (as described in, for example, JP 2011-172343A). This drive system performs such control to suppress an excessively high electric power from being input into the battery and suppresses the direct current voltage of the inverter from becoming excessively high.

CITATION LIST

Patent Literature

PTL 1: JP2011-172343A

SUMMARY

In the above drive system, in the process of shifting the inverter from the gate blocking state to the three phase-on state, when all the switching elements of an upper arm (or a lower arm) of the inverter are almost simultaneously turned on, it is likely that a positive electrode line and a negative electrode line of power lines have a short circuit via the upper arm and the lower arm in a certain phase where electric current flows in a diode of the lower arm (or the upper arm) at that timing among respective phases of the motor and that high current flows in the element of the certain phase to cause a failure of the element.

A drive system of the present disclosure mainly aims to more effectively suppress a failure of each element included in an inverter that is configured to drive a motor.

In order to achieve the above primary object, the drive system of the disclosure is implemented by an aspect described below.

The present disclosure is directed to a drive system. The drive system including a motor, an inverter including a plurality of switching elements and a plurality of diodes that are connected in parallel to the plurality of switching elements, the inverter configured to drive the motor by switching of the plurality of switching elements, a power storage device connected with the inverter via a power line, and a control device configured to control the inverter, the drive system further including a current sensor configured to detect a phase current of each phase of the motor. The control device shifts the inverter from a gate blocking state to a three phase-on state, when it is determined that electric current flows in a diode of an upper arm by referring to the phase current of each phase, the control device turns on a switching element of the upper arm and thereby shifts the inverter to an upper arm three phase-on state, or when it is determined that electric current flows in a diode of a lower arm by referring to the phase current of each phase, the control device turns on a switching element of the lower arm and thereby shifts the inverter to a lower arm three phase-on state.

The drive system of this aspect shifts the inverter from the gate blocking state to the three phase-on state. When it is determined that electric current flows in the diode of the upper arm by referring to the phase current of each phase, the drive system turns on the switching element of the upper arm and thereby shifts the inverter to the upper arm three phase-on state. When it is determined that electric current flows in the diode of the lower arm of the inverter by referring to the phase current of each phase, the drive system turns on the switching element of the lower arm and thereby shifts the inverter to the lower arm three phase-on state. In the shift to the upper arm three phase-on state, this configuration prevents a short circuit between a positive electrode line and a negative electrode line of the power line via the upper arm and the lower arm in each phase when the switching element of the upper arm in the phase is turned on. This accordingly prevents a high current from flowing in the element of the phase. In the shift to the lower arm three phase-on state, this configuration also prevents a short circuit between the positive electrode line and the negative electrode line of the power line via the upper arm and the lower arm in each phase when the switching element of the lower arm in the phase is turned on. This accordingly prevents a high current from flowing in the element of the phase. As a result, this more effectively suppresses a failure of each element of the inverter.

DESCRIPTION OF EMBODIMENTS

The following describes aspects of the present disclosure with reference to some embodiments.

Embodiment

Figure 1:
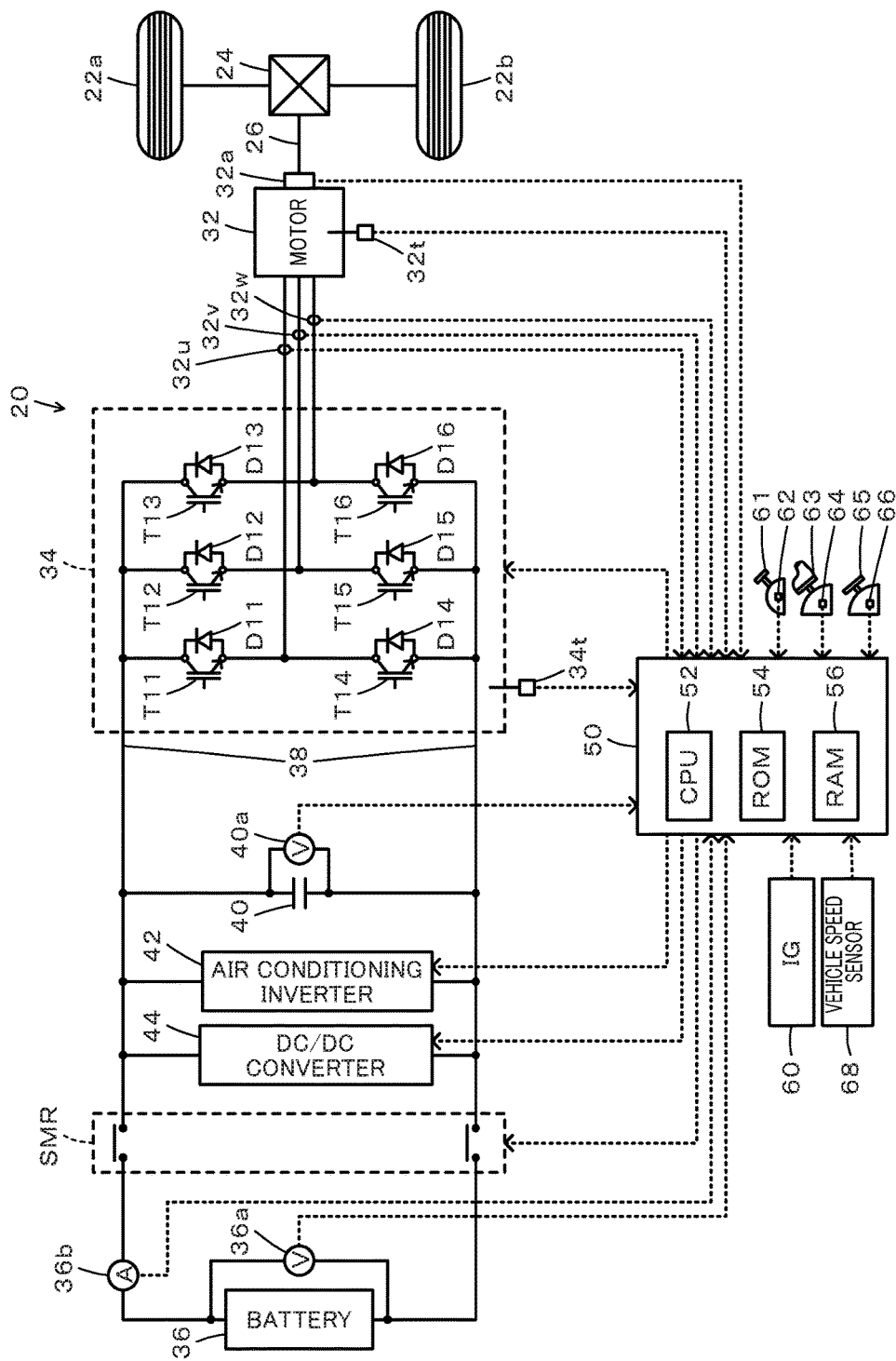
FIG. 1 is a configuration diagram illustrating the schematic configuration of an electric vehicle 20 equipped with a drive system according to an embodiment of the present disclosure.

FIG. 1 is a configuration diagram illustrating the schematic configuration of an electric vehicle 20 equipped with a drive system according to an embodiment of the present disclosure. As illustrated, the electric vehicle 20 of the embodiment includes a motor 32, an inverter 34, a battery 36 as a power storage device, a system main relay SMR and an electronic control unit 50.

The motor 32 is configured as a synchronous motor generator having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is used to drive the motor 32 and is connected with the battery 36 via power lines 38. This inverter 34 includes six transistors T11 to T16 and six diodes D11 to D16. The transistors T11 to T16 are arranged in pairs, such that two transistors in each pair respectively serve as a source and a sink relative to a positive electrode line and a negative electrode line of the power lines 38. The respective phases of the three-phase coils (U phase, V phase and W phase) of the motor 32 are connected with connection points of the respective pairs of the transistors T11 to T16. The diodes D11 to D16 are connected in parallel to the respective corresponding transistors T11 to T16, such that a direction from the negative electrode line side to the positive electrode line side of the power lines 38 is a forward direction. When a voltage is applied to the inverter 34, the electronic control unit 50 serves to regulate the rates of ON times of the respective pairs of the transistors T11 to T16, such as to provide a rotating magnetic field in the three-phase coils and thereby rotate and drive the motor 32. In the description below, the transistors T11 to T13 and the diodes D11 to D13 are called "upper arm", and the transistors T14 to T16 and the diodes D14 to D16 are called "lower arm". A capacitor 40 for smoothing is mounted to the positive electrode line and the negative electrode line of the power lines 38.

The battery 36 is configured as, for example, a lithium ion rechargeable battery or a nickel metal hydride battery and is connected with the inverter 34 via the power lines 38 as described above. An air conditioning inverter 42 provided in an air conditioner and a DC/DC converter 44 configured to step down an electric power of the power lines 38 and supply the stepped-down electric power to an auxiliary machinery battery and auxiliary machinery are also connected with the power lines 38, in addition to the inverter 34 and the battery 36.

The system main relay SMR is provided on the battery 36-side of the inverter 34, the capacitor 40, the air conditioning inverter 42 and the DC/DC converter 44 in the power lines 38. The system main relay SMR is controlled on and off by the electronic control unit 50 to connect and disconnect the inverter 34, the capacitor 40, the air conditioning inverter 42 and the DC/DC converter 44 with and from the battery 36.

The electronic control unit 50 is configured as a CPU 52-based microprocessor and includes a ROM 54 configured to store processing programs, a RAM 56 configured to temporarily store data and input/output ports, in addition to the CPU 52, although not being illustrated. Signals from various sensors are input into the electronic control unit 50 via the input port. The signals input into the electronic control unit 50 include, for example, a rotational position $\theta m$ of the rotor of the motor 32 from a rotational position detection sensor (for example, resolver) 32a configured to detect the rotational position of the rotor of the motor 32, phase currents Iu, Iv and Iw of the respective phases of the motors 32 from current sensors 32u, 32v and 32w configured to detect the phase currents of the respective phases of the motor 32, a temperature tm of the motor 32 from a temperature sensor 32t configured to detect the temperature (for example, coil temperature) of the motor 32, and a temperature ti of the inverter 34 from a temperature sensor 34t configured to detect the temperature (for example, element temperature) of the inverter 34. The input signals also include a voltage Vb of the battery 36 from a voltage sensor 36a mounted between terminals of the battery 36, an electric current Ib of the battery 36 from a current sensor 36b mounted to an output terminal of the battery 36, and a voltage VL of the power lines 38 (capacitor 40) from a voltage sensor 40a mounted between terminals of the capacitor 40. The input signals additionally include an ignition signal from an ignition switch 60 and a shift position SP from a shift position sensor 62 configured to detect an operating position of a shift lever 61. The input signals further include an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68. Various controls signals are output from the electronic control unit 50 via the output port. The signals output from the electronic control unit 50 include, for example, switching control signals to the transistors T11 to T16 of the inverter 34, an on/off control signal to the system main relay SMR, a control signal to the air conditioning inverter 42 and a control signal to the DC/DC converter 44. The electronic control unit 50 calculates an electrical angle $\theta e$, an angular velocity $\omega m$ and a rotation speed Nm of the motor 32, based on the rotational position $\theta m$ of the rotor of the motor 32 input from the rotational position detection sensor 32a. The electronic control unit 50 also calculates a state of charge SOC of the battery 36, based on an integrated value of the electric current Ib of the battery 36 input from the current sensor 36b. The state of charge SOC herein denotes a ratio of the capacity of electric power dischargeable from the battery 36 to the overall capacity of the battery 36.

In the electric vehicle 20 of the embodiment having the above configuration, the CPU 52 of the electronic control unit 50 sets a required torque Td* that is required for the driveshaft 26, based on the accelerator position Acc and the vehicle speed V, sets the set required torque Td* to a torque command Tm* of the motor 32, and performs switching control of the transistors T11 to T16 of the inverter 34, so as to drive the motor 32 with the torque command Tm*.

Figure 2:
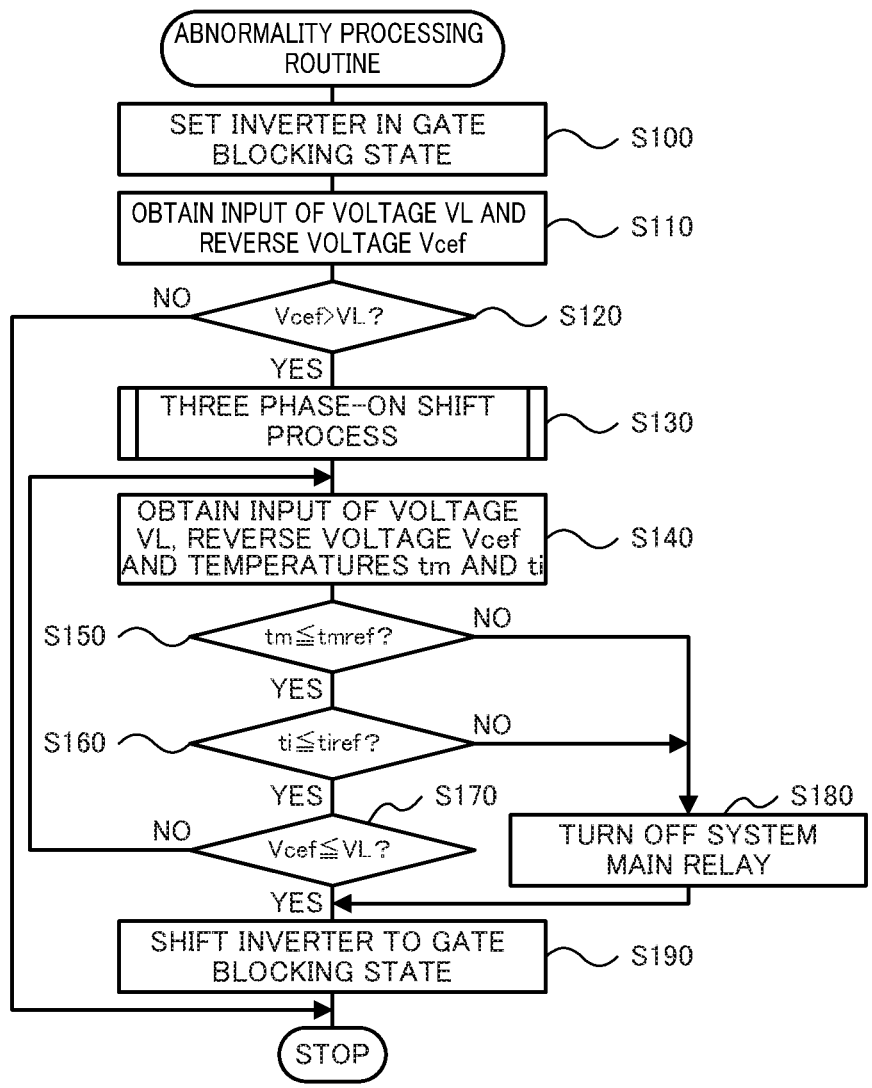
FIG. 2 is a flowchart showing one example of an abnormality processing routine performed by an electronic control unit 50.

The following describes the operations of the electric vehicle 20 of the embodiment having the above configuration or more specifically a series of operations on the occurrence of an abnormality in the motor 32 or in the rotational position detection sensor 32a. FIG. 2 is a flowchart showing one example of an abnormality processing routine performed on the occurrence of such an abnormality by the electronic control unit 50. On a start of this routine, the electronic control unit 50 stops driving the air conditioning inverter 42 and the DC/DC converter 44.

When the abnormality processing routine of FIG. 2 is triggered, the CPU 52 of the electronic control unit 50 first sets the inverter 34 in a gate blocking state in which all the transistors T11 to T16 are off (step S100). The CPU 52 subsequently obtains input of data such as the voltage VL of the power lines 38 (capacitor 40) and a reverse voltage Vcef generated with rotation of the motor 32 (step S110). The input of the voltage VL of the power lines 38 (capacitor 40) is a value detected by the voltage sensor 40a. The input of the reverse voltage Vcef of the motor 32 is a value calculated by multiplying the angular velocity ωm of the motor 32 that is based on the rotational position θm of the rotor of the motor 32 detected by the rotational position detection sensor 32a, by a reverse voltage constant Km. The angular velocity ωm of the motor 32 may be calculated by multiplying the vehicle speed V by a conversion factor.

After obtaining the input of the data, the CPU 52 compares the reverse voltage Vcef of the motor 32 with the voltage VL of the power lines 38 (step S120). When the reverse voltage Vcef of the motor 32 is higher than the voltage VL of the power lines 38, an electric power based on the reverse voltage Vcef of the motor 32 is rectified by the diodes D11 to D16 of the inverter 34 and is supplied to the battery 36 via the power lines 38. There is accordingly a possibility that an excessively high electric power is input into the battery or that the voltage VL of the power lines 38 becomes excessively high. The process of step S120 determines whether there is such a possibility. When the reverse voltage Vcef of the motor 32 is equal to or lower than the voltage VL of the power lines 38, the CPU 52 determines that there is no such possibility and terminates the routine.

Figure 3:
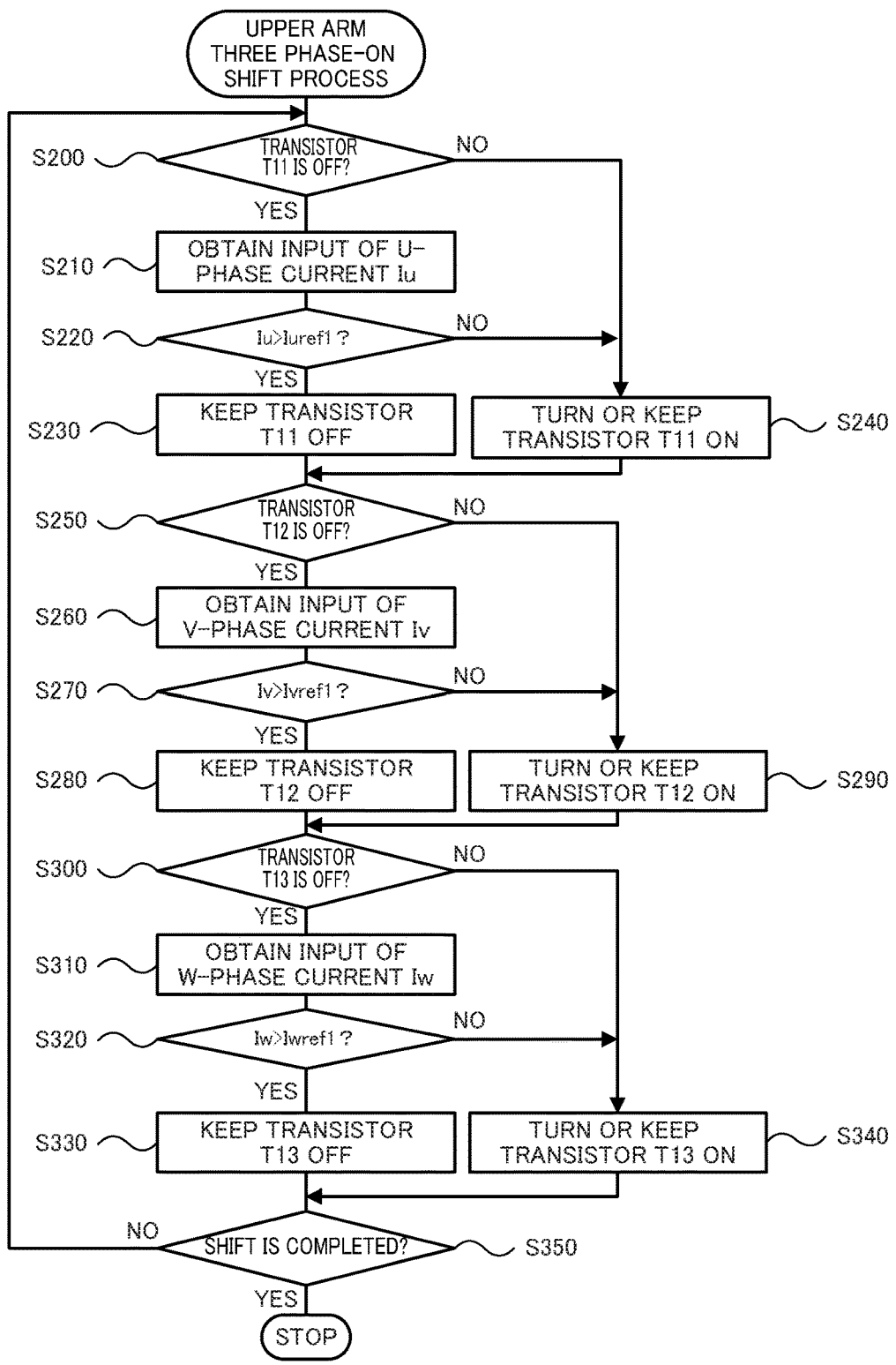
FIG. 3 is a flowchart showing one example of an upper arm three phase-on shift process.

When the reverse voltage Vcef of the motor 32 is higher than the voltage VL of the power lines 38 at step S120, the CPU 52 determines that there is the possibility described above and shifts the inverter 34 from the gate blocking state to a three phase-on state (step S130). The three phase-on state includes an upper arm three phase-on state in which all the transistors T11 to T13 of the upper arm are on and a lower arm three phase-on state in which all the transistors T14 to T16 of the lower arm are on. According to the embodiment, an upper arm three phase-on shift process of FIG. 3 is performed to shift the inverter 34 from the gate blocking state to the upper arm three phase-on state. Shifting the inverter 34 to the three phase-on state (upper arm three phase-on state) causes electric current to be circulated between the motor 32 and the inverter 34 and causes no electric power to be supplied from the inverter 34 toward the power lines 38. This configuration suppresses an excessively high electric power from being input into the battery 36 and suppresses the voltage VL of the power lines 38 from becoming excessively high. This accordingly protects the battery 36, the capacitor 40, the air conditioning inverter 42, and the DC/DC converter 44. The following describes the upper arm three phase-on shift process of FIG. 3 with interruption of the description of the abnormality processing routine of FIG. 2.

In the upper arm three phase-on shift process of FIG. 3, the electronic control unit 50 first determines whether the transistor T11 is on or off (step S200). When the transistor T11 is off, the electronic control unit 50 obtains input of the phase current Iu of the U phase (step S210) and compares the input phase current Iu of the U phase with a negative reference value Iuref1 (step S220). The input of the phase current Iu of the U phase is a value detected by the current sensor 32u (positive value in a direction from the inverter 34-side toward the motor 32-side). In the state that both the transistors T11 and T14 are off, electric current is expected to flow in the diode D14 when the phase current Iu has a positive value, whereas electric current is expected to flow in the diode D11 when the phase current Iu has a negative value. The reference value Iuref1 is a criterion value used to determine that electric current flows in the diode D11 out of the diodes D11 and D14 and may be, for example, −5 A, −7 A or −10 A by taking into account a detection error of the current sensor 32u.

When the phase current Iu of the U phase is higher than the reference value Iuref1 at step S220, the electronic control unit 50 keeps the transistor T11 off (step S230). When the phase current Iu of the U phase is equal to or lower than the reference value Iuref1, on the other hand, the electronic control unit 50 turns the transistor T11 on (step S240). When it is determined that the transistor T11 is on at step S200, the electronic control unit 50 keeps the transistor T11 on (step S240). Accordingly, in the state that the transistor T11 is off, when the phase current Iu of the U phase becomes equal to or lower than the reference value Iuref1, the transistor T11 is turned and kept on.

The electronic control unit 50 subsequently determines whether the transistor T12 is on or off (step S250). When the transistor T12 is off, the electronic control unit 50 obtains input of the phase current Iv of the V phase (step S260) and compares the input phase current Iv of the V phase with a negative reference value Ivref1 (step S270). The input of the phase current Iv of the V phase is a value detected by the current sensor 32v (positive value in the direction from the inverter 34-side toward the motor 32-side). In the state that both the transistors T12 and T15 are off, electric current is expected to flow in the diode D15 when the phase current Iv has a positive value, whereas electric current is expected to flow in the diode D12 when the phase current Iv has a negative value. The reference value Ivref1 is a criterion value used to determine that electric current flows in the diode D12 out of the diodes D12 and D15 and may be, for example, −5 A, −7 A or −10 A by taking into account a detection error of the current sensor 32v.

When the phase current Iv of the V phase is higher than the reference value Ivref1 at step S270, the electronic control unit 50 keeps the transistor T12 off (step S280). When the phase current Iv of the V phase is equal to or lower than the reference value Ivref1, on the other hand, the electronic control unit 50 turns the transistor T12 on (step S290). When it is determined that the transistor T12 is on at step S250, the electronic control unit 50 keeps the transistor T12 on (step S290). Accordingly, in the state that the transistor T12 is off, when the phase current Iv of the V phase becomes equal to or lower than the reference value Ivref1, the transistor T12 is turned and kept on.

The electronic control unit 50 subsequently determines whether the transistor T13 is on or off (step S300). When the transistor T13 is off, the electronic control unit 50 obtains input of the phase current Iw of the W phase (step S310) and compares the input phase current Iw of the W phase with a negative reference value Iwref1 (step S320). The input of the phase current Iw of the W phase is a value detected by the current sensor 32w (positive value in the direction from the inverter 34-side toward the motor 32-side). In the state that both the transistors T13 and T16 are off, electric current is expected to flow in the diode D16 when the phase current Iw has a positive value, whereas electric current is expected to flow in the diode D13 when the phase current Iw has a negative value. The reference value Iwref1 is a criterion value used to determine that electric current flows in the diode D13 out of the diodes D13 and D16 and may be, for example, −5 A, −7 A or −10 A by taking into account a detection error of the current sensor 32w.

When the phase current Iw of the W phase is higher than the reference value Iwref1 at step S320, the electronic control unit 50 keeps the transistor T13 off (step S330). When the phase current Iw of the W phase is equal to or lower than the reference value Iwref1, on the other hand, the electronic control unit 50 turns the transistor T13 on (step S340). When it is determined that the transistor T13 is on at step S300, the electronic control unit 50 keeps the transistor T13 on (step S340). Accordingly, in the state that the transistor T13 is off, when the phase current Iw of the W phase becomes equal to or lower than the reference value Iwref1, the transistor T13 is turned and kept on.

The electronic control unit 50 subsequently determines whether the shift of the inverter 34 to the upper arm three phase-on state (i.e., the state that all the transistors T11 to T13 of the upper arm are on) has been completed (step S350). When it is determined that the shift of the inverter 34 to the upper arm three phase on-state has not yet been completed (i.e., it is determined that any of the transistors T11 to T13 of the upper arm is off), the electronic control unit 50 returns to step S200. When the processing of steps S200 to S350 is repeatedly performed and it is determined that the shift of the inverter 34 to the upper arm three phase on-state has been completed (i.e., it is determined that all the transistors T11 to T13 of the upper arm are turned and kept on), the electronic control unit 50 terminates this routine.

In the process of shifting the inverter 34 from the gate blocking state to the upper arm three phase-on state, when all the transistors of the upper arm are almost simultaneously turned on, it is likely that the positive electrode line and the negative electrode line of the power lines 38 have a short circuit via the upper arm and the lower arm in a certain phase where electric current flows in the diode of the lower arm at that timing among the respective phases and that high current flows in the element of the certain phase to cause a failure of the element. The configuration of this embodiment, however, shifts the inverter 34 to the upper arm three phase-on state by turning on the transistor T11 of the upper arm in the U phase when the phase current Iu of the U phase is equal to or lower than the reference value Iuref1 (i.e., when it is determined that electric current flows in the diode D11), turning on the transistor T12 of the upper arm in the V phase when the phase current Iv of the V phase is equal to or lower than the reference value Ivref1 (i.e., when it is determined that electric current flows in the diode D12), and turning on the transistor T13 of the upper arm in the W phase when the phase current Iw of the W phase is equal to or lower than the reference value Iwref1 (i.e., when it is determined that electric current flows in the diode D13). This configuration prevents a short circuit between the positive electrode line and the negative electrode line of the power lines 38 via the upper arm and the lower arm in any of the U phase, the V phase and the W phase when the transistor of the upper arm is turned on in this phase. As a result, this more effectively suppresses a failure of the respective elements of the inverter 34.

The foregoing describes the upper arm three phase-on shift process of FIG. 3. The description goes back to the abnormality processing routine of FIG. 2. On completion of the upper arm three phase-on shift process, the electronic control unit 50 obtains input of data such as the voltage VL of the power lines 38, the reverse voltage Vcef of the motor 32, the temperature tm of the motor 32 and the temperature ti of the inverter 34 (step S140). The input of the voltage VL of the power lines 38 and the input of the reverse voltage Vcef of the motor 32 are described above. The input of the temperature tm of the motor 32 is a value detected by the temperature sensor 32t. The input of the temperature ti of the inverter 34 is a value detected by the temperature sensor 34t.

After the input of the data, the electronic control unit 50 compares the temperature tm of the motor 32 with a reference value tmref (step S150) and also compares the temperature ti of the inverter 34 with a reference value tiref (step S160). The reference value tmref is an allowable temperature that is slightly lower than the overheating temperature of the motor 32 and may be, for example, 160° C., 180° C. or 200° C. The reference temperature tiref is an allowable temperature that is slightly lower than the overheating temperature of the inverter 34 and may be, for example, 120° C., 140° C. or 160° C.

When the temperature tm of the motor 32 is equal to or lower than the reference value tmref at step S150 and the temperature ti of the inverter 34 is equal to or lower than the reference value tiref at step S160, the electronic control unit 50 determines that the temperatures of both the motor 32 and the inverter 34 are equal to or lower than the allowable temperatures and subsequently compares the reverse voltage Vcef of the motor 32 with the voltage VL of the power lines 38 (step S170). When the reverse voltage Vcef of the motor 32 is higher than the voltage VL of the power lines 38, the electronic control unit 50 returns to step S140. In this case, the inverter 34 is maintained in the three phase on-state (upper arm three phase-on state). When the reverse voltage Vcef of the motor 32 is equal to or lower than the voltage VL of the power lines 38, on the other hand, the electronic control unit 50 shifts the inverter 34 to the gate blocking state (step S190) and then terminates this routine.

When the temperature tm of the motor 32 is higher than the reference temperature tmref at step S150 or when the temperature ti of the inverter 34 is higher than the reference temperature tiref at step S160, on the other hand, the electronic control unit 50 determines that the temperature of the motor 32 or the temperature of the inverter 34 exceeds the allowable temperature. The electronic control unit 50 subsequently turns off the system main relay SMR (step S180), shifts the inverter 34 to the gate blocking state (step S190), and then terminates this routine. It is here assumed that the air conditioning inverter 42 and the DC/DC converter 44 stop driving and that the inverter 34 is in the three phase-on state (upper arm three phase-on state). In this case, electric current is circulated between the motor 32 and the upper arm of the inverter 34, and no electric current flows in the power lines 38. This configuration accordingly suppresses adhesion of the system main relay SMR in the process of turning off the system main relay SMR. This process shifts the inverter 34 to the gate blocking state after turning off the system main relay SMR. When the reverse voltage Vcef of the motor 32 is higher than the voltage VL of the capacitor 40 immediately before this process, the voltage VL of the capacitor 40 promptly increases (within a very short time) to be equal to the reverse voltage Vcef of the motor 32 and stops the flow of electric current in the respective elements of the inverter 34. When the reverse voltage Vcef of the motor 32 is equal to or lower than the voltage VL of the capacitor 40 immediately before this process, on the other hand, electric current immediately stops flowing in the respective elements of the inverter 34. This accordingly suppresses the overheat of the respective elements of the inverter 34.

Figure 4:
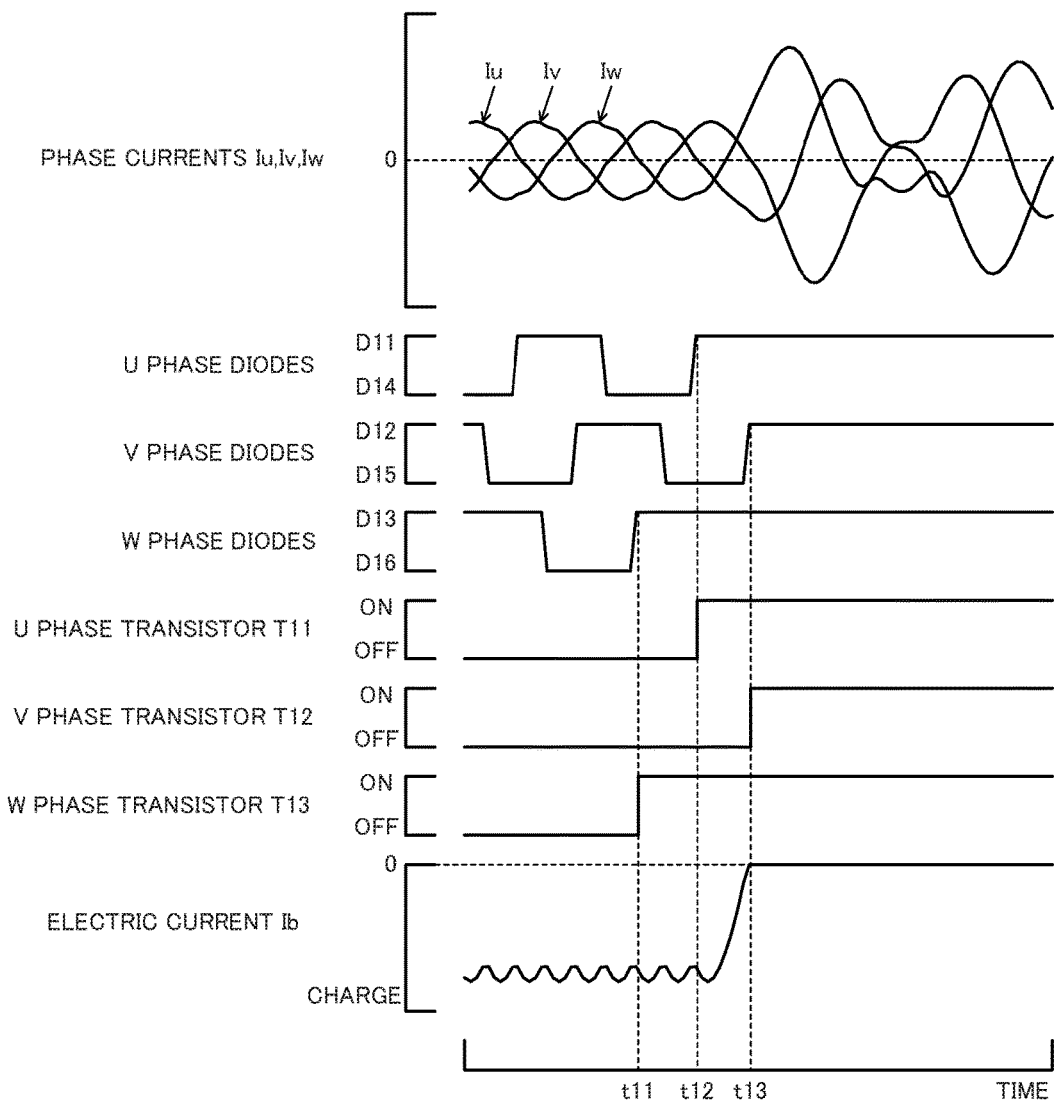
FIG. 4 is a diagram showing one example of a process of shifting an inverter 34 from a gate blocking state to an upper arm three phase-on state.

FIG. 4 is a diagram showing one example of the process of shifting the inverter 34 from the gate blocking state to the upper arm three phase-on state. FIG. 4 shows the phase currents Iu, Iv and Iw of the respective phases, the flows of electric current in the diodes of the upper arm and the lower arm in the respective phases, the on-off states of the transistors of the upper arm in the respective phases, and the electric current Ib of the battery 36 (positive value when the battery 36 is discharged). As illustrated, in the gate blocking state of the inverter 34, when electric current starts flowing in the diode D13 of the upper arm in the W phase at a time t11, the transistor T13 of the upper arm is turned on. When electric current starts flowing in the diode D11 of the upper arm in the U phase at a time t12, the transistor T11 of the upper arm is turned on. When electric current starts flowing in the diode D12 of the upper arm in the V phase at a time t13, the transistor T12 of the upper arm is turned on. This completes the shift of the inverter 34 to the upper arm three phase-on state. This configuration prevents a short circuit between the positive electrode line and the negative electrode line of the power lines 38 via the upper arm and the lower arm in any of the U phase, the V phase and the W phase when the transistor of the upper arm is turned on in this phase. When the inverter 34 is shifted to the upper arm three phase-on state, the electric current Ib of the battery 36 becomes equal to zero.

The drive system mounted on the electric vehicle 20 of the embodiment described above shifts the inverter 34 from the gate blocking state to the three phase-on state or more specifically to the upper arm three phase-on state by turning on the transistor T11 of the upper arm in the U phase when the phase current Iu of the U phase is equal to or lower than the reference value Iuref1 (i.e., when it is determined that electric current flows in the diode D11), turning on the transistor T12 of the upper arm in the V phase when the phase current Iv of the V phase is equal to or lower than the reference value Ivref1 (i.e., when it is determined that electric current flows in the diode D12), and turning on the transistor T13 of the upper arm in the W phase when the phase current Iw of the W phase is equal to or lower than the reference value Iwref1 (i.e., when it is determined that electric current flows in the diode D13). This configuration prevents a short circuit between the positive electrode line and the negative electrode line of the power lines 38 via the upper arm and the lower arm in any of the U phase, the V phase and the W phase when the transistor of the upper arm is turned on in this phase. As a result, this more effectively suppresses a failure of the respective elements of the inverter 34.

In the three phase-on state (upper arm three phase-on state) of the inverter 34, when the temperature tm of the motor is higher than the reference value tmref or when the temperature ti of the inverter 34 is higher than the reference value tiref, the drive system mounted on the electric vehicle 20 of the embodiment turns off the system main relay SMR and subsequently shifts the inverter 34 to the gate blocking state. The system main relay SMR is turned off when the air conditioning inverter 42 and the DC/DC converter 44 stop driving and the inverter 34 is in the three phase-on state. This suppresses adhesion of the system main relay SMR. The process of shifting the inverter 34 to the gate blocking state after turning off the system main relay SMR suppresses the overheat of the respective elements of the inverter 34.

In the drive system mounted on the electric vehicle 20 of the embodiment, the electronic control unit 50 performs the upper arm three phase-on shift process of FIG. 3 to shift the inverter 34 to the upper arm three phase-on state, as the process of step S130 in the abnormality processing routine of FIG. 2, i.e., as the process of shifting the inverter 34 from the gate blocking state to the three phase-on state. A modification may alternatively perform a lower arm three phase-on shift process of FIG. 5 to shift the inverter 34 to a lower arm three phase-on state.

Figure 5:
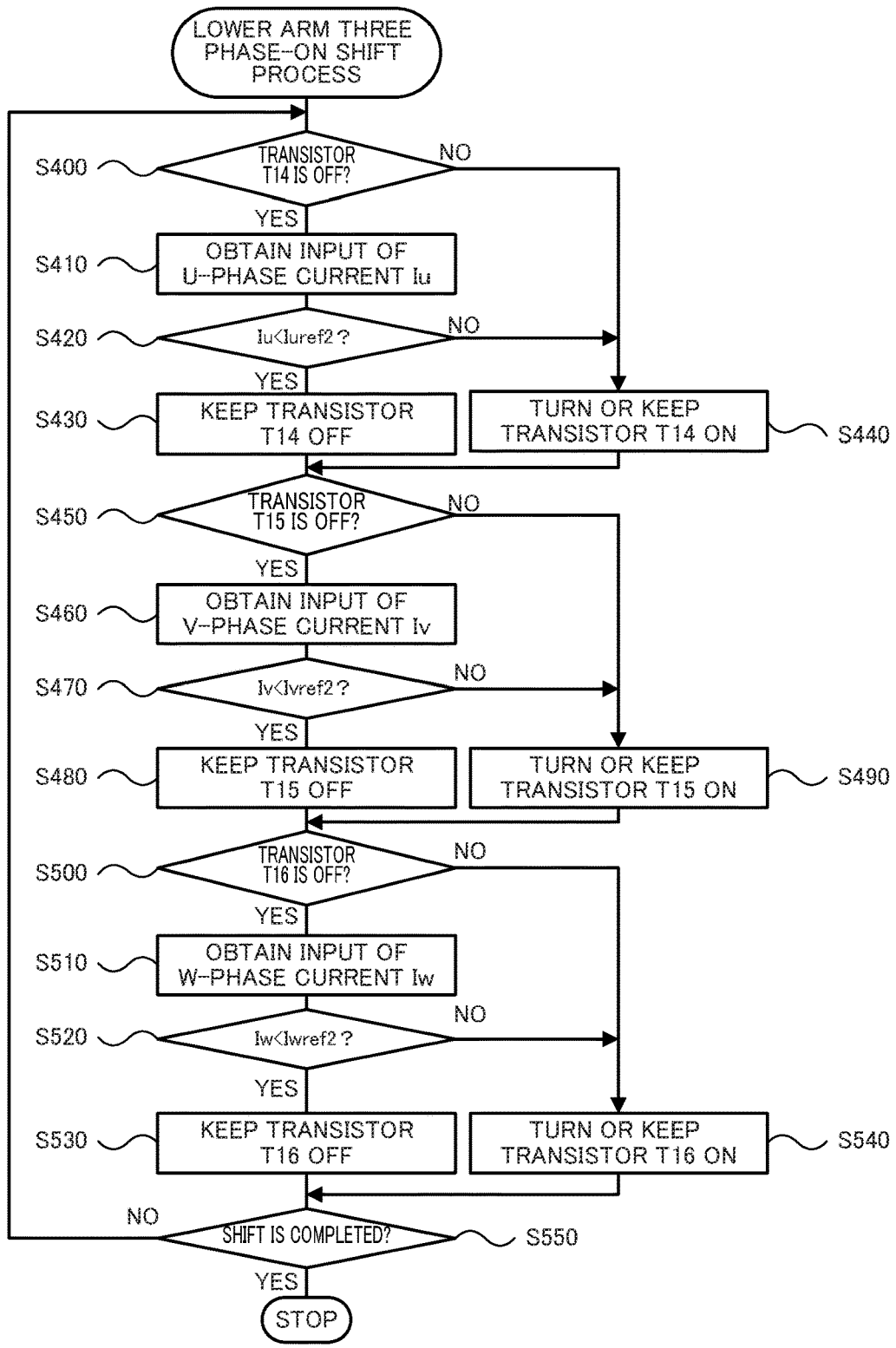
FIG. 5 is a flowchart showing one example of a lower arm three phase-on shift process.

In the lower arm three phase-on shift process of FIG. 5, the electronic control unit 50 first determines whether the transistor T14 is on or off (step S400). When the transistor T14 is off, the electronic control unit 50 obtains the input of the phase current Iu of the U phase (step S410) and compares the input phase current Iu of the U phase with a positive reference value Iuref2 (step S420). As described above, in the state that both the transistors T11 and T14 are off, electric current is expected to flow in the diode D14 when the phase current Iu has a positive value, whereas electric current is expected to flow in the diode D11 when the phase current Iu has a negative value. The reference value Iuref2 is a criterion value used to determine that electric current flows in the diode D14 out of the diodes D11 and D14 and may be, for example, 5 A, 7 A or 10 A by taking into account a detection error of the current sensor 32u.

When the phase current Iu of the U phase is lower than the reference value Iuref2 at step S420, the electronic control unit 50 keeps the transistor T14 off (step S430). When the phase current Iu of the U phase is equal to or higher than the reference value Iuref2, on the other hand, the electronic control unit 50 turns the transistor T14 on (step S440). When it is determined that the transistor T14 is on at step S400, the electronic control unit 50 keeps the transistor T14 on (step S440). Accordingly, in the state that the transistor T14 is off, when the phase current Iu of the U phase becomes equal to or higher than the reference value Iuref2, the transistor T14 is turned and kept on.

The electronic control unit 50 subsequently determines whether the transistor T15 is on or off (step S450). When the transistor T15 is off, the electronic control unit 50 obtains input of the phase current Iv of the V phase (step S460) and compares the input phase current Iv of the V phase with a positive reference value Ivref2 (step S470). As described above, in the state that both the transistors T12 and T15 are off, electric current is expected to flow in the diode D15 when the phase current Iv has a positive value, whereas electric current is expected to flow in the diode D12 when the phase current Iv has a negative value. The reference value Ivref2 is a criterion value used to determine that electric current flows in the diode D15 out of the diodes D12 and D15 and may be, for example, 5 A, 7 A or 10 A by taking into account a detection error of the current sensor 32v.

When the phase current Iv of the V phase is lower than the reference value Ivref2 at step S470, the electronic control unit 50 keeps the transistor T15 off (step S480). When the phase current Iv of the V phase is equal to or higher than the reference value Ivref2, on the other hand, the electronic control unit turns the transistor T15 on (step S490). When it is determined that the transistor T15 is on at step S450, the electronic control unit 50 keeps the transistor T15 on (step S490). Accordingly, in the state that the transistor T15 is off, when the phase current Iv of the V phase becomes equal to or higher than the reference value Ivref2, the transistor T15 is turned and kept on.

The electronic control unit 50 subsequently determines whether the transistor T16 is on or off (step S500). When the transistor T16 is off, the electronic control unit 50 obtains input of the phase current Iw of the W phase (step S510) and compares the input phase current Iw of the W phase with a positive reference value Iwref2 (step S520). As described above, in the state that both the transistors T13 and T16 are off, electric current is expected to flow in the diode D16 when the phase current Iw has a positive value, whereas electric current is expected to flow in the diode D13 when the phase current Iw has a negative value. The reference value Iwref2 is a criterion value used to determine that electric current flows in the diode D16 out of the diodes D13 and D16 and may be, for example, 5 A, 7 A or 10 A by taking into account a detection error of the current sensor 32w.

When the phase current Iw of the W phase is lower than the reference value Iwref2 at step S520, the electronic control unit 50 keeps the transistor T16 off (step S530). When the phase current Iw of the W phase is equal to or higher than the reference value Iwref2, on the other hand, the electronic control unit turns the transistor T16 on (step S540). When it is determined that the transistor T16 is on at step S500, the electronic control unit 50 keeps the transistor T16 on (step S540). Accordingly, in the state that the transistor T16 is off, when the phase current Iw of the W phase becomes equal to or higher than the reference value Iwref2, the transistor T16 is turned and kept on.

The electronic control unit 50 subsequently determines whether the shift of the inverter 34 to the lower arm three phase-on state (i.e., the state that all the transistors T14 to T16 of the lower arm are on) has been completed (step S550). When it is determined that the shift of the inverter 34 to the lower arm three phase on-state has not yet been completed (i.e., it is determined that any of the transistors T14 to T16 of the lower arm is off), the electronic control unit 50 returns to step S400. When the processing of steps S400 to S550 is repeatedly performed and it is determined that the shift of the inverter 34 to the lower arm three phase on-state has been completed (i.e., it is determined that all the transistors T14 to T16 of the lower arm are turned and kept on), the electronic control unit 50 terminates this routine.

This modification shifts the inverter 34 from the gate blocking state to the three phase-on state or more specifically to the lower arm three phase-on state by turning on the transistor T14 of the lower arm in the U phase when the phase current Iu of the U phase is equal to or higher than the reference value Iuref2 (i.e., when it is determined that electric current flows in the diode D14), turning on the transistor T15 of the lower arm in the V phase when the phase current Iv of the V phase is equal to or higher than the reference value Iuref2 (i.e., when it is determined that electric current flows in the diode D15), and turning on the transistor T16 of the lower arm in the W phase when the phase current Iw of the W phase is equal to or higher than the reference value Iwref2 (i.e., when it is determined that electric current flows in the diode D16). This configuration prevents a short circuit between the positive electrode line and the negative electrode line of the power lines 38 via the upper arm and the lower arm in any of the U phase, the V phase and the W phase when the transistor of the lower arm is turned on in this phase. As a result, this more effectively suppresses a failure of the respective elements of the inverter 34.

The drive system mounted on the electric vehicle 20 according to the above embodiment or according to the above modification shifts the inverter 34 to the three phase-on state (upper arm three phase-on state or lower arm three phase-on state) when the inverter 34 is in the gate blocking state and the reverse voltage Vcef of the motor 32 is higher than the voltage VL of the power lines 38. A modification may shift the inverter 34 to the three phase-on state when the inverter 34 is in the gate blocking state and electric power Pch input into the battery 36 is higher than a reference value Pchref. Another modification may shift the inverter 34 to the three phase-on state when the inverter 34 is in the gate blocking state, the reverse voltage Vcef of the motor 32 is higher than the voltage VL of the power lines 38 and the electric power Pch input into the battery 36 is higher than the reference value Pchref. The electric power Pch input into the battery 36 may be calculated as the product of the voltage Vb of the battery 36 detected by the voltage sensor 36a and the electric current Ib of the battery 36 detected by the current sensor 36b (positive value when the battery 36 is charged). These modifications also suppress an excessively high electric power from being input into the battery 36 and suppresses the voltage VL of the power lines 38 from becoming excessively high.

The drive system mounted on the electric vehicle 20 according to the above embodiment or according to the above modifications shifts the inverter 34 to the three phase-on state (upper arm three phase-on state or lower arm three phase-on state) when the inverter 34 is in the gate blocking state and the reverse voltage Vcef of the motor 32 is higher than the voltage VL of the power lines 38 or the like. A modification may shift the inverter 34 to the three phase-on state when the inverter 34 is in the gate blocking state, irrespective of the reverse voltage Vcef of the motor 32 or the like.

The drive system mounted on the electric vehicle 20 according to the above embodiment or according to the above modification shifts the inverter 34 to the gate blocking state when the inverter 34 is in the three phase-on state (upper arm three phase-on state or lower arm three phase-on state) and the reverse voltage Vcef of the motor 32 is equal to or lower than the voltage VL of the power lines 38. A modification may maintain the inverter 34 in the three phase-on state. In this modification, the inverter 34 may be shifted to the gate blocking state, for example, when the motor 32 stops rotation.

The drive system mounted on the electric vehicle 20 according to the above embodiment or according to the above modification turns off the system main relay SMR and subsequently shifts the inverter 34 to the gate blocking state when the inverter 34 is in the three phase-on state (upper arm three phase-on state or lower arm three phase-on state) and the temperature tm of the motor 32 is higher than the reference value tmref or the temperature ti of the inverter 34 is higher than the reference value tiref. When the inverter 34 is in the three phase-on state, however, a modification may turn off the system main relay SMR or may keep the system main relay SMR on, irrespective of the temperature tm of the motor 32 and the temperature ti of the inverter 34. In the configuration of turning off the system main relay SMR irrespective of the temperature tm of the motor 32 and the temperature ti of the inverter 34, the inverter 34 may be maintained in the three phase-on state when the temperature tm of the motor 32 is equal to or lower than the reference value tmref and the temperature ti of the inverter 34 is equal to or lower than the reference value tiref. The inverter 34 may be shifted to the gate blocking state when the temperature tm of the motor 32 is higher than the reference value tmref or when the temperature ti of the inverter 34 is higher than the reference value tiref.

The above embodiment and the above modifications describe the configuration of the drive system mounted on the electric vehicle 20. As long as the drive system is equipped with the motor, the inverter and the power storage device, the drive system may be configured to be mounted on a hybrid vehicle or may be configured to be mounted on stationary equipment such as construction equipment.

In the drive system of the embodiment, the control device may shift the inverter to the three phase-on state, when the inverter is in the gate blocking state and a reverse voltage of the motor generated with rotation of the motor is higher than a direct current voltage of the inverter. In addition, the control device may shift the inverter to the three phase-on state, when the inverter is in the gate blocking state and an electric power input into the storage device is higher than a predetermined power. This configuration suppresses an excessively high electric power from being input into the battery and suppresses the voltage of the power line from becoming excessively high.

In addition, in the drive system of the embodiment including a relay provided on the power line, the control device may shift the inverter to the three phase-on state and subsequently turn off the relay. This configuration enables the relay to be turned off in the state that no electric power is supplied from the inverter to the battery. This suppresses adhesion of the relay.

In this case, a capacitor is mounted to the power line, and the control device may turn off the relay and subsequently shift the inverter to the gate blocking state, when the inverter is in the three phase-on state and temperature of the motor becomes higher than a first predetermined temperature and/or temperature of the inverter becomes higher than a second predetermined temperature. The drive system of this configuration shifts the inverter to the gate blocking state after turning off the relay. When the reverse voltage of the motor is higher than the voltage of the capacitor immediately before this process, the voltage of the capacitor promptly increases (within a very short time) to be equal to the reverse voltage of the motor and stops the flow of electric current in the respective elements of the inverter. When the reverse voltage of the motor is equal to or lower than the voltage of the capacitor immediately before this process, on the other hand, electric current immediately stops flowing in the respective elements of the inverter. This accordingly suppresses the overheat of the respective elements of the inverter.

The following describes the correspondence relationship between the primary components of the embodiment and the primary components of the disclosure described in Summary. The motor 32 of the embodiment corresponds to the "motor", the inverter 34 corresponds to the "inverter", the battery 36 corresponds to the "power storage device", and the electronic control unit 50 corresponds to the "control device". And system main relay SMR corresponds to the "relay".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of drive systems.

The invention claimed is:

1. A drive system, comprising:
a motor;
an inverter including a plurality of switching elements and a plurality of diodes that are connected in parallel to the plurality of switching elements, the inverter configured to drive the motor by switching of the plurality of switching elements;
a power storage device connected with the inverter via a power line; and
a control device configured to control the inverter,
the drive system further comprising:
a current sensor configured to detect a phase current of each phase of the motor, wherein
the control device shifts the inverter from a gate blocking state to a three phase-on state, wherein
when it is determined that electric current flows in a diode of an upper arm by referring to the phase current of each phase, the control device turns on a switching element of the upper arm and thereby shifts the inverter to an upper arm three phase-on state, or
when it is determined that electric current flows in a diode of a lower arm by referring to the phase current of each phase, the control device turns on a switching element of the lower arm and thereby shifts the inverter to a lower arm three phase-on state.

2. The drive system according to claim 1,
wherein the control device shifts the inverter to the three phase-on state, when the inverter is in the gate blocking state and a reverse voltage of the motor generated with rotation of the motor is higher than a direct current voltage of the inverter.

3. The drive system according to claim 1,
wherein the control device shifts the inverter to the three phase-on state, when the inverter is in the gate blocking state and an electric power input into the storage device is higher than a predetermined power.

4. The drive system according to claim 1, further comprising:
a relay provided on the power line, wherein
the control device shifts the inverter to the three phase-on state and subsequently turns off the relay.

5. The drive system according to claim 4,
wherein a capacitor is mounted to the power line, and
the control device turns off the relay and subsequently shifts the inverter to the gate blocking state, when the inverter is in the three phase-on state and temperature of the motor becomes higher than a first predetermined temperature and/or temperature of the inverter becomes higher than a second predetermined temperature.

* * * * *